Nov. 22, 1966   A. S. CRAVEN, JR   3,287,026
FLEXIBLE BED WHEELED VEHICLE
Filed Feb. 4, 1965   4 Sheets-Sheet 1
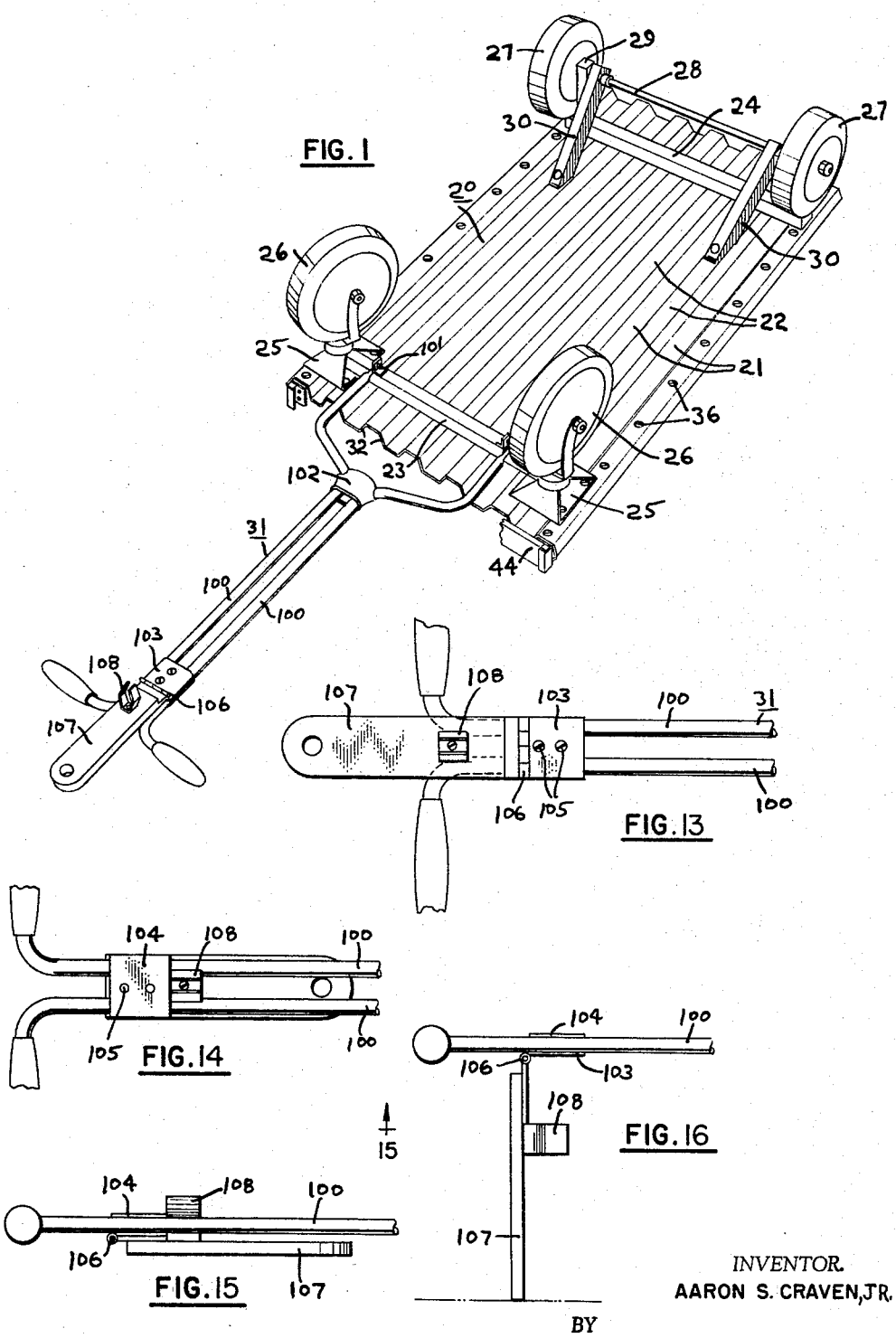
INVENTOR.
AARON S. CRAVEN, JR.
BY
Walter B. Udell
ATTORNEY Nov. 22, 1966  A. S. CRAVEN, JR  3,287,026
FLEXIBLE BED WHEELED VEHICLE
Filed Feb. 4, 1965  4 Sheets-Sheet 2
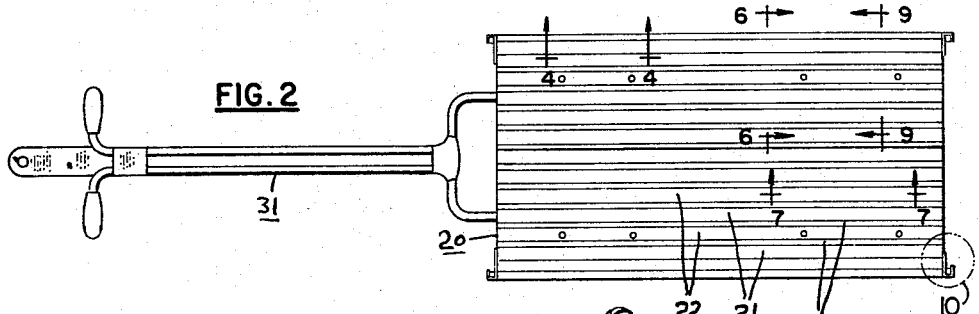
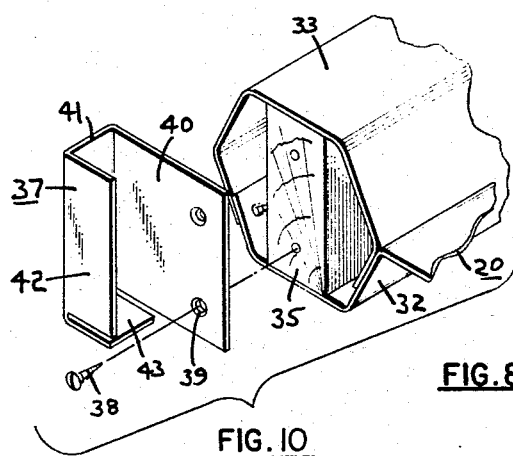
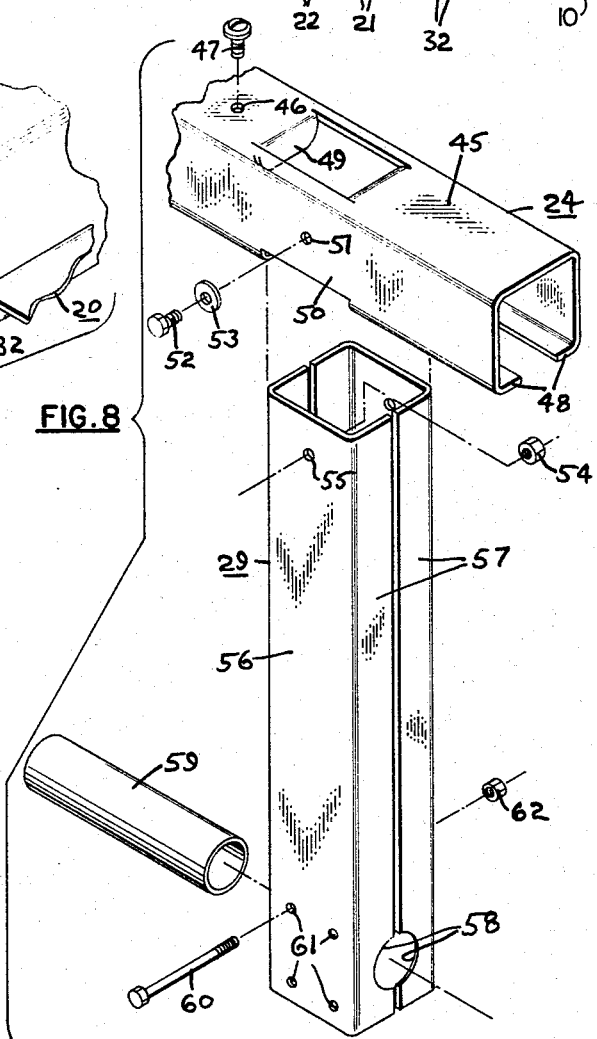
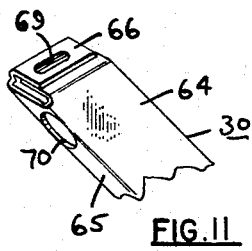
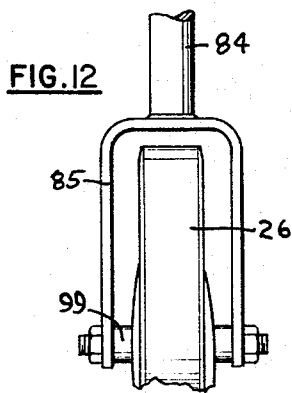
INVENTOR.
AARON S. CRAVEN, JR.
BY
Walter B. Udell
ATTORNEY.

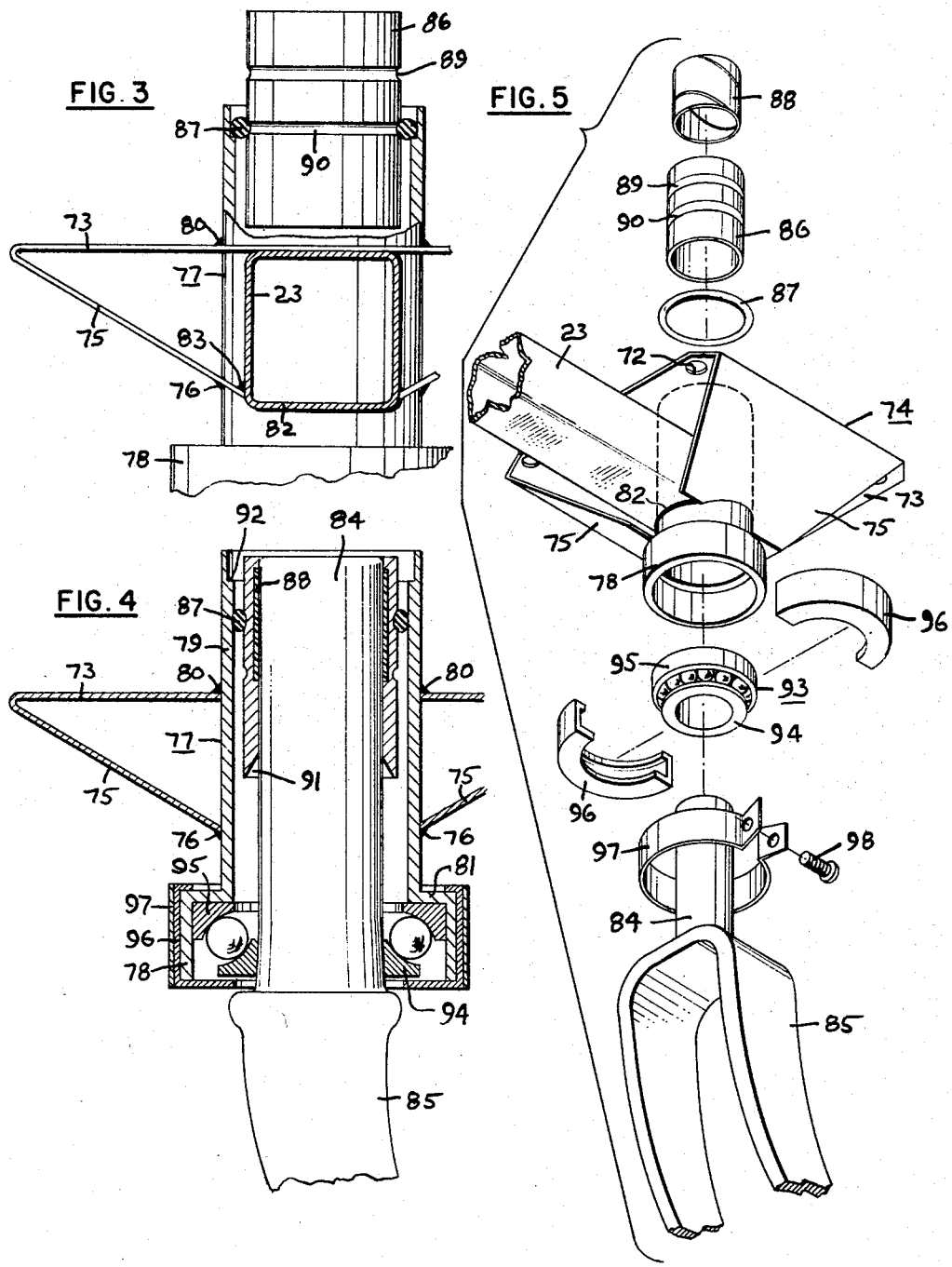

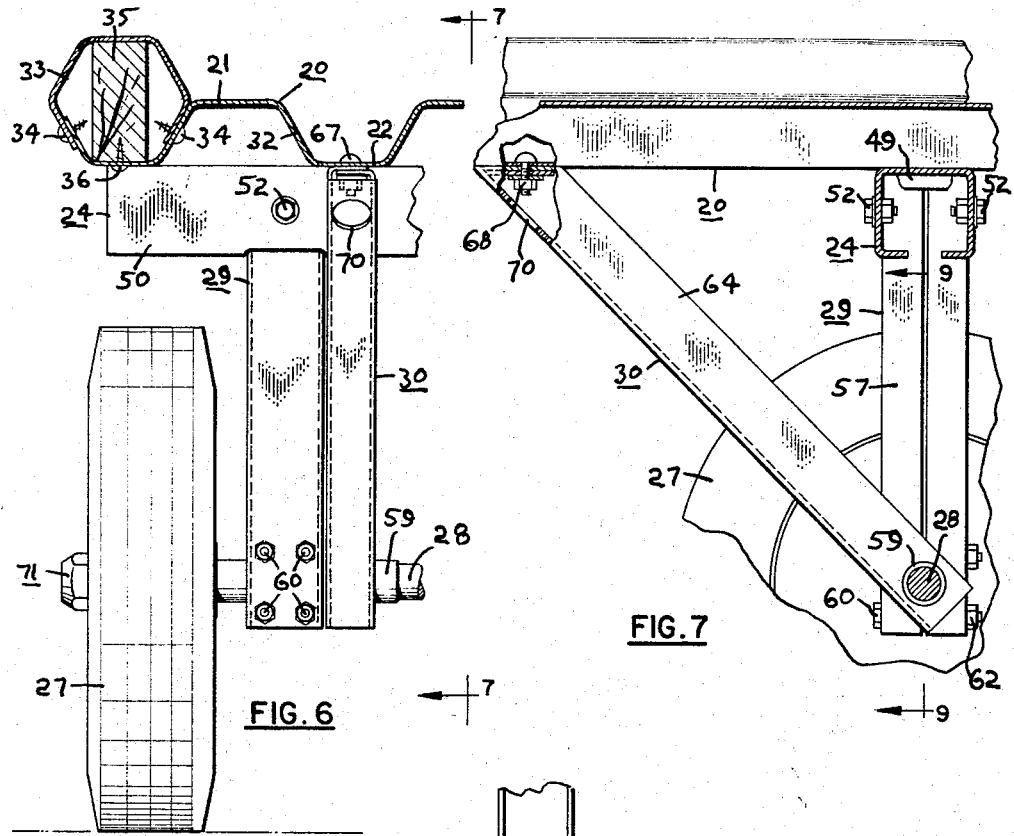
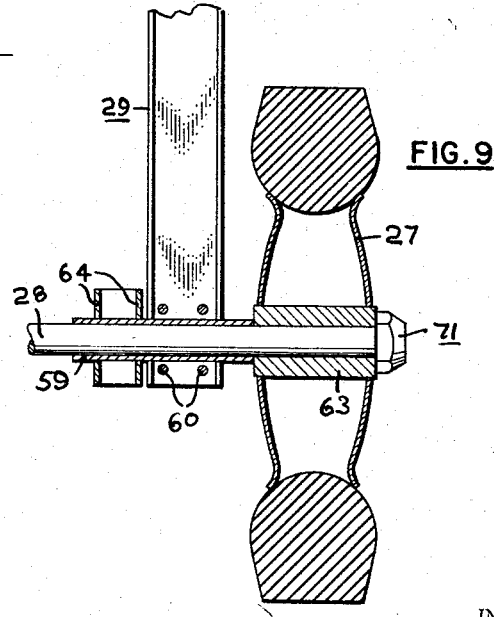

United States Patent Office 3,287,026
Patented Nov. 22, 1966

3,287,026
FLEXIBLE BED WHEELED VEHICLE
Aaron S. Craven, Jr., 505 Independence Ave.,
Philadelphia, Pa.
Filed Feb. 4, 1965, Ser. No. 430,387
6 Claims. (Cl. 280—415)

This invention relates generally to wheeled vehicles of the type generally desigated as wagons. More particularly, this invention relates to a novel wheeled vehicle provided with a flexible bed structure which enables the vehicle to traverse uneven terrain or flooring surfaces with a great degree of stability and without setting up undue destructive stresses in the vehicle structure.

Known types of wagons incorporate in one form or another a rigid bed, this being sometimes effected by utilization of locked-up thick wood and steel platforms, or by the use of lighter weight platforms fixedly supported by an underlying rigid frame structure usually of rectangular form and provided with cross bracing. The support for the bed of these devices is provided by wheels or casters located at the four corners of the vehicle. When such a rigid bed vehicle traverses an uneven surface, the bottom surfaces of the wheels or casters, which are intended to remain in a common plane, cannot do so and one of the wheels loses contact with the surface. This results in a heavy diagonal stress through the bed of the vehicle due to the load being carried, such stress eventually setting up strains which eventually crack the rigid supporting frame at a corner.

The wheeled vehicle according to this invention avoids this problem by eliminating the use of a rigidly locked up frame and takes advantage of the high strength characteristics of sheet metal stock when formed with a particular convoluted cross-section. Accordingly, it is a primary object of my invention to provide a novel flexible bed wheeled vehicle of generally rectangular form carried by underlying wheels or casters disposed at the four corners thereof wherein the vehicle bed is capable of flexing along lines extending diagonally thereof so that the surface engaging portions of the wheels or casters may move out of plane with one another over uneven surfaces and maintain engagement with the underlying supporting surface.

Another object of my invention is to provide a novel flexible bed wheeled vehicle as aforesaid which also includes a novel wheel bearing structure effective to absorb the major portion of shocks induced laterally or transversely into the bearing by transmission from the associated wheel or caster, as for example when striking curbs over which the vehicle is to be moved.

A still further object of this invention is to provide a novel vehicle as aforesaid which is handle drawn and which incorporates as part of the handle a captive tow bar compactly folded and secured in non-interfering position when not in use, but which may be quickly unsecured and moved into operative position for connection to a self-powered mobile device when it is desired to draw the vehicle by the latter.

The foregoing and other objects of my invention will become clear from reading the following specification in conjunction with examination of the appended drawings, wherein:

FIGURE 1 is a perspective view of the inverted wheeled vehicle according to the invention grossly illustrating the features thereof;

FIGURE 2 is a plan view of the vehicle shown in FIGURE 1, but on a somewhat reduced scale;

FIGURES 3, 4 and 5 all illustrate details of the novel bearing structure which carries the front wheels of the vehicle, FIGURE 4 being a vertical sectional view through the structure as would be seen when viewed along the line 4—4 of FIGURE 2, while FIGURE 5 is an exploded view of the assembly, FIGURE 3 illustrating the anti-shock upper sleeve portion of the bearing structure in partly assembled condition;

FIGURE 6 is a vertical cross sectional view through the wheeled vehicle taken substantially centrally and looking rearwardly as would be seen when viewed along the lines 6—6 of FIGURE 2;

FIGURE 7 is a longitudinal vertical sectional view through the wheeled vehicle proximate the rear end thereof and looking laterally outward toward the rear wheel support structure, as would be seen when viewed along the lines 7—7 of FIGURES 2 and 6;

FIGURE 8 is an enlarged fragmentary perspective exploded view of the rear wheel support column and body support beam assembly;

FIGURE 9 is a vertical sectional view through the rear axle and rear wheel together with its supporting column as would be seen when viewed along the lines 9—9 of FIGURES 2 and 7;

FIGURE 10 is an enlarged fragmentary perspective view of the front and rear brackets carried by the vehicle for removably supporting front and rear transversely extending rails, and is an enlargement of the detail shown in the phantom circle designated as 10 on FIGURE 2;

FIGURE 11 is a fragmentary perspective view of the upper end of the rear axle support strut also seen in FIGURES 6 and 7;

FIGURE 12 is a front elevational view of one of the front casters of the vehicle;

FIGURE 13 is an enlarged detail of the vehicle handle end illustrating in plan view the tow bar in its use position similar to that seen in FIGURE 1;

FIGURE 14 is the reverse plan view of that shown in FIGURE 13 with the tow bar structure reversely swung and latched into the handle in its non-use position;

FIGURE 15 is a side elevational view of the structure of FIGURE 14 as would be seen when viewed the line 15—15 thereof; and FIGURE 16 shows the tow bar unsecured from the handle and swung downward into a vertical ground engaging and handle supporting position.

In the several figures, like elements are denoted by like reference characters.

Referring now to the figures and firstly to FIGURES 1 and 2 it is observed that the vehicle includes a rectangular bed 20 formed of sheet metal which is convoluted to provide front to rear extending crests 21 alternating widthwise across the bed with troughs 22, front and rear transversely extending support beams 23 and 24 respectively upon which the bed 20 is supported, front bearing assemblies 25 each carrying a caster 26, a pair of rear wheels 27 mounted upon an axle 28 carried by vertical support columns 29 and diagonal struts 30, and a handle assembly 31.

All of the crests 21 lie in a common horizontal plane in the bed member 20 and all of the troughs 22 lie in a second horizontal plane spaced vertically below the plane of the crests, the crests and troughs being of the same width and spaced laterally of one another with their proximate longitudinally extending parallel edges being spaced laterally apart and connected to one another by sidewall portions 32 lying in planes extending diagonally of the planes of the crests and troughs. In cross-section, the bed 20 thus appears as a plurality of uniformly laterally spaced and joined together ribs of equilateral trapezoidal shape, mathematically representable as a periodic equilateral trapezoidal function. The beam strength of this configuration is very high for load produced deflection about an axis transverse to the crests or troughs, but is not very high about an axis longitudinally parallel to the crests or troughs. Consequently, the bed 20 requires no longitudinal extending rigid support and only need be provided with transversely extending support which is in fact supplied by the front and rear beams 23 and 24.

Deflections about an axis extending diagonally through the bed from one corner to another is substantially greater than that about a transverse axis and substantially less than that about a longitudinal axis, and it is this deflection ability of the bed which provides the requisite flexibility enabling the supporting wheels or casters to individually move out of plane with respect to the others without developing a critical stress at corners of the structure. The degree of flexibility is determined by the geometry employed, the thickness of the bed sheet material and the characteristics of the particular material utilized. Excellent results have been obtained with a wheeled vehicle according to the present invention with a bed 20 having the following characteristics:

Length: 48 inches
Width: 30 inches
Material: 20 gauge (.036″) low carbon steel
Pitch: 4½ inches
Depth: 1 5/16 inches outside to outside
Sidewall angle: 52 degrees from horizontal
Load: 350 pounds per square foot on 42 inch span
Weight: 22 pounds As best seen in FIGURES 6 and 10 the longitudinally extending side edges of the vehicle bed are provided with side rails formed from sheet metal cap members 33 having five faces coincident with a hexagon, three adjacent sides of which would be defined by two sidewall portions 32 and either a crest or a trough of the rectangular bed 20. The cap member 33 is held to the bed 20 by self tapping screws 34 passing thereinto and also through a pair of adjacent bed sidewalls 32. Disposed within the hexagonal shell formed by the side rail cap members 33 and the underlying bed portion is a wood strip 35 extending from front to back through the side rail and secured therein by screws 36 projected upward through holes in the bed 20, the upper surface of the wood strip being engaged by the cap member 33.

Closing the front and rear ends of the hollow side rail structures are brackets 37 secured to the ends of the wood strips 35 by screws 38 projected through holes 39 in the bracket wall 40. Turned at right angles to the bracket mounting wall 40 is a side wall 41 from the remote edge of which an end wall 42 turns inward into parallel spaced relation to the mounting wall 40, a bottom step 43 being turned upward from the lower edge of sidewall 41 and between the mounting wall 40 and end wall 42 of the bracket. As best seen in FIGURE 1, these brackets permit the quick insertion and removal of transversely extending front and rear rails 44. These drop-in rails may be made of any suitable material and can be used in conjunction with the side rails to provide a closed perimeter about the bed 20 if desired. Also, if desired, a relatively thin sheet of stiff material such as plywood may be cut to bed size within the perimeter to provide a smooth carting surface, such sheet being unsecured to the bed to prevent loss of flexibility.

Referring now to FIGURES 6 through 9 and 11 for details of the rear undercarriage and supporting structure, it is observed that the support beam 24 is a one piece member of square channel shape or C-shape in cross-section extending from one side of the bed to the other with the channel opening or slot facing downward so that the bed 20 is seated upon the continuous top wall 45 of the support beam. As best seen in FIGURE 8, the support beam top wall 45 is apertured as at 46 so that a washer head self-tapping screw 47 may be projected downward through a corresponding hole in a trough 22 of the bed plate and into threaded engagement in the hole 46 to secure the bed to the support beam.

As best seen in FIGURE 8, the slot defining lower flanges 48 of rear support beam 24 are cut away at a point inward from the end of the support beam so that the vertical support column 29 can be projected upward into the beam 24 to the top wall 45 thereof and between ears 49 turned downward out of the support beam top wall, the ears 49 being spaced apart by the width of support column 29. The depending channel side walls 50 of support beam 24 are apertured as at 51 substantially immediately between the ears 49 to permit the passage therethrough of bolt 52 which together with washer 53 and nut 54 secure the upper ends of support columns 29 of the rear support beam 24, the bolt 52 passing through an aperture 55 in the base wall 56 of the U-shaped channel members which form the support columns 29.

The vertical support columns 29 for the rear axle 28 consist of a pair of U-shaped channels having base walls 56 and side walls 57 positioned with their channel openings presenting toward one another to form a generally hollow rectangular structure. The channel side walls 57 are each arcuately cut away as at 58 proximate the lower ends thereof to form a circular aperture within and through which is extended a cylindrical sleeve 59, the sleeve 59 being clamped between the column channels by bolts 60 projected through apertures 61 in the base walls 56 of the columnar channels and secured by nuts 62. The sleeve 59 functions as a sleeve bearing for axle 28, and as is best seen in FIGURES 6 and 9 extends laterally outward beyond the vertical columns 29 to act as a spacer against which the inner end of wheel hub 63 may be disposed. The sleeve 59 also extends laterally inward of the vertical support column 29 so that the lower end of the proximate diagonal strut 30 may be supportably carried thereby by projection of the sleeve through alined holes in the opposite side walls 64 of the channel shaped struts 30.

As best seen from FIGURES 6, 7 and 11, the upper end of the base wall 65 of each strut 30 is resected away so that the upper ends of the strut side walls 64 may be turned inward over one another to provide an upper end 66 which can be fixedly secured to the bed 20 by means of a bolt 67 and nut 68 projected through a hole in the bed and correspondingly positioned holes 69 punched through the strut upper end 66. The nut 68 may be reached through the access hole 70 punched through the strut base wall 65 proximate the upper end of the strut. The rear wheels 27 are held on the axle 28 by means of the nuts 71.

Consider now FIGURES 3, 4 and 5 which illustrate in detail the vehicle front support structure including the novel caster bearings according to the invention. From FIGURE 1 it is observed that the front bearings assemblies 25 are secured to the bed by bolts or screws projected through the corner apertures 72 in the base plate portion 73 of the semi-pyramidal sheet metal mounting base 74. Turned back at an angle from a pair of opposite edges of the base plate 73 are rigidifying and reinforcing legs 75 welded as at 76 at their lower ends to a part of the outer periphery of hollow cylindrical bearing housing 77.

Cylindrical bearing housing 77 is formed from two hollow cylindrical coaxially end aligned portions of different diameter, the lower portion 78 being of larger diameter but of shorter axial extent than the portion 79 extending upward therefrom through the base plate 73 to a point of termination thereabove, the upper portion 79 being fixedly secured to the base plate by the peripherally extended weld 80. The upper end of the cylindrical upper portion 79 is open as is the bottom end of lower cylindrical portion 78, these upper and lower bearing housing portions being fixedly interconnected by radially extending annular wall 81 therebetween. As is best seen in FIGURES 3 and 5, the opposite ends of the front support beam 23 are rigidly secured to the cylindrical bearing housing 77 by a weld 82 and to the base legs 75 of the mounting base 74 by welds 83.

The cylindrical sleeve bearing housing 77 contains two separate bearings which engage respectively the upper and lower end regions of each front caster vertically extending swivel shaft 84, the lower end of which is rigidly affixed to the bridge of the caster fork 85. The upper bearing housed by the cylindrical upper portion 79 of bearing housing 77 is a floating sleeve bearing which permits free rotation therewithin of the caster shaft 84 together with a certain amount of resilient lateral movement, while the lower bearing is a combination radial and thrust ball bearing which supports the vertical load and also withstands lateral impact.

The upper sleeve bearing includes three parts, a hollow cylindrical sleeve 86, an elastomer O-ring 87 and a helically cut low friction bearing sleeve 88. The cylindrical sleeve 86 is provided with a pair of axially spaced peripherally extending circular grooves 89 and 90, a conical peripherally extending inside taper 91 at its lower end, and a peripherally extending inside cylindrical recess in its upper region within which is fitted the low friction bearing sleeve 88, this latter feature being best seen in the showing of FIGURE 4. As also best seen in FIGURE 4 the recess within which the low friction bearing sleeve 88 is disposed does not extend upward completely to the top of cylindrical sleeve 86 so that the bearing sleeve 88 is restrained against axial movement within the cylindrical sleeve 86 so that axial motion of the caster swivel shaft 84 cannot eventually eject the bearing sleeve 88 from its position within the cylindrical sleeve 86. The helical cut in the bearing sleeve 88 allows the sleeve diameter to be reduced so that it may be projected downward into the bearing sleeve 86 and then allowed to resiliently expand into its conforming recess, nylon being a suitable bearing material.

The sleeve bearing is assembled into the bearing housing by first rolling the elastomer O-ring 87 over the outer surface of cylindrical sleeve 86 until the O-ring drops into lower groove 90, and then projecting the assembled O-ring 87 and sleeve 86 downward into the open end of cylindrical upper portion 79 of the bearing housing 77 until the O-ring seats upon a peripherally extending internal shoulder 92, as best seen in FIGURE 3. From FIGURE 3 it is observed that the outer diameter of O-ring 87 is larger than that of the internal diameter of the cylindrical upper portion 79 below the shoulder 92. Consequently, when the upper end of cylindrical sleeve 86 is pressed axially downward, O-ring 87 is placed in radial compression and rolls upward out of groove 90 and toward groove 89 while being simultaneously carried downward inside the cylindrical bearing housing below the shoulder 92. The downward movement of cylindrical sleeve 86 is continued until O-ring 87 drops into upper groove 89, at which point the physical relationship shown in FIGURE 4 exists. This is a mechanically stable position for the sleeve 86 and it will be appreciated that the sleeve may move within limits radially within the bearing housing, and may also rotate laterally within limits about a horizontal axis through the O-ring.

The combination radial and thrust ball bearing 93 is projected downward onto the shaft 84, with the lower or inner race 94 being press fitted onto the shaft at the lower end thereof. The shaft 84 with ball bearing affixed thereto is now projected upward from the bottom into the bearing housing 77 so that the upper end of the shaft 84 is led into and upward through the upper sleeve bearing by the conical taper 91 at the lower end thereof until the upper race 95 of ball bearing 93 seats against the annular wall 81 which joins the housing upper section 79 to the lower section 78, the diameter of the upper race 95 being such as to fit closely within the inside diameter of housing bottom portion 78 to thereby prevent undue lateral play.

The assembly is retained against vertical separation by a pair of semicircular locking clamping pieces 96 of generally C-shape in vertical cross section, the clamping pieces being close fittingly disposed peripherally around the cylindrical botttom portion 78 with the upper arm of each clamping piece overlying the housing wall 81 and the lower arm of each clamping piece underlying the undersurface of ball bearing lower race 94 in spaced relation therebelow. The locking clamping pieces 96 are retained in position by a clamping band 97 disposed peripherally thereabout and pulled up tight by means of a machine screw 98.

As best seen in FIGURE 12 the wheel 26 of the caster is secured to the fork 85 by the usual axle bolt and nuts and is spaced from the fork arms by low friction bushings 99. As is best seen in FIGURE 4, the ball retaining faces of the ball bearing races have a slightly larger radius curvature than that of the ball bearings so that a certain amount of pivoting between the races is possible. This feature combined with the floating and resilient shiftability of the upper sleeve bearing provides a shock absorbing action to the bearing structure when the caster 26 is subjected to impulses having horizontal components.

Referring again to FIGURE 1 it is seen that the handle assembly 31 is formed from a pair of tubular metal pieces 100 having a main longitudinally extending straight portion terminating at the handle end in oppositely turned out parts covered with suitable hand grips, while at the end proximate the vehicle the tubular parts are first turned laterally outward and again longitudinally backward to terminating ends pivotally secured as at 101 to brackets which are affixed to the underside of the front support beam 23. The handle forming metal pieces 100 are clamped together by a locking collar 102 where they turn outward proximate to the vehicle. The handle tubular parts 100 are also locked together in properly spaced relationship proximate their outer handle terminations by a clamping assembly including a pair of clamping plates 103 and 104 disposed respectively on the underside and upper side of the tubular handle pieces and secured together by machine screws or bolts 105 as also seen in FIGURES 13 and 14.

Referring now also to FIGURES 13 through 16, it is observed that the clamping plate 103 carries at its forward edge one half of a hinge 106, the other half of this hinge 106 being formed on one end of the elongated generally rectangular tow bar 107. Fixed to the underside of the tow bar 107 is a C-shaped spring clip 108 which snaps between the handle tubular metal pieces to thereby detent the tow bar 107 in an out of the way position as shown in FIGURES 14 and 15 when the bar is not in use. When the tow bar 107 is extended for use it is observed that the tubular parts of the handle seat downward thereon to provide a locked structure preventing the handle 31 from dropping downward into engagement with the ground when the tow bar is connected to a pulling vehicle.

Having now described my invention in connection with a particularly illustrated embodiment thereof, it will be appreciated that variations and modifications of my invention may now naturally occur from time to time to those persons normally skilled in the art without departing from the essential scope or spirit of the invention, and accordingly it is intended to claim the same broadly as well as specifically as indicated by the appended claims.

What is claimed as new and useful is:

1. A flexible bed wheeled vehicle comprising in combination:
   (1) a one piece bed made from substantially uniform thickness sheet material convoluted to form as viewed in cross section a plurality of adjacent ribs comprising alternating crests and troughs, the vertical distance between the top of a crest and the bottom of a trough being many times greater than the sheet material thickness to thereby form a bed which is substantially inflexible about axes orthogonal to said ribs and flexible within limits about axes parallel to said ribs,
   (2) a support structure including only a single pair of spaced apart elongated rigid support beams extending transversely to said crests and troughs of said ribs in underlying relation to said bed with substantially all of said troughs seated upon and supported by said beams, said single pair of beams being disposed respectively proximate to the front and rear ends of said bed and being coupled to one another only through the bed itself so that a line joining one end of one of said beams to the remote end of the other of said beams extends diagonally to the longitudinal extent of said bed ribs, whereby said bed may flex about such diagonal within limits, (3) means securing said bed to said support structure, and (4) a plurality of wheels carried by said vehicle in underlying relation to said bed operative to support the latter from an underlying surface.

2. A flexible bed wheeled vehicle comprising in combination:

(1) a one piece bed made from substantially uniform thickness sheet material comprising a plurality of adjacent parallel rectilinear ribs extending longitudinally from front to back of the bed and convoluted as viewed in cross-section to form alternating crests and troughs, the vertical distance between the top of a crest and the bottom of a trough being many times greater than the sheet material thickness to thereby form a bed which is substantially inflexible about axes orthogonal to said ribs and flexible within limits about axes parallel to said ribs, (2) a support structure including a single pair of front and rear spaced apart substantially parallel rigid support beams extending substantially orthogonally to said bed ribs in underlying relation to said bed with substantially all of said troughs seated upon and supported by said beams, said bed being free of any support members extending transversely thereto between said front and rear support beams and said beams being coupled to one another only through the bed itself so that lines joining the ends of said front beam with the opposite ends of said rear beam extend uninterruptedly therebetween diagonally to the longitudinal extent of said bed ribs, whereby said bed may flex about such diagonals within limits, (3) means securing said bed to said support structure, and (4) a plurality of wheels carried by said support structure in underlying relation to said bed operative to support the latter from an underlying surface.

3. A flexible bed wheeled vehicle comprising in combination:

(1) a one piece bed made from substantially uniform thickness sheet material comprising a plurality of adjacent parallel rectilinear ribs extending longitudinally from front to back of the bed and convoluted as viewed in cross-section to form alternating crests and troughs, the vertical distance between the top of a crest and the bottom of a trough being many times greater than the sheet material thickness to thereby form a bed which is substantially inflexible about axes orthogonal to said ribs and flexible within limits about axes parallel to said ribs, (2) a support structure including front and rear spaced apart substantially parallel rigid support beams extending substantially orthogonally to said bed ribs in underlying relation to said bed with substantially all of said troughs seated upon and supported by said beams, so that lines joining the ends of one beam with the opposite ends of the other beam extend diagonally to the longitudinal extent of said bed ribs, whereby said bed may flex about such diagonals within limits, (3) means securing said bed to said support structure, and (4) a plurality of wheels with at least one wheel carried by said support structure in underlying relation to said bed proximate to each end of said front and rear rigid support beams, the rear wheels being each carried on an axle extending close fittingly through a sleeve secured to the lower end of a vertical support column, the upper end of which column is projected into and rigidly locked to said rear rigid support, and a reinforcing strut for each rear wheel having a lower end through which said axle sleeve is close fittingly projected and an upper end fixedly secured to a trough of said bed at a point thereon longitudinally displaced from the axle position to thereby incline the strut at an angle to the plane of the bed, and the front wheels being each of the caster type mounted in a swivel bearing for rolling motion about a horizontal axis and swivelling movement about a vertical axis.

4. The wheeled vehicle as set forth in claim 3 wherein said rear support beam is of hollow generally rectangular cross section, has its downwardly facing wall area cut away proximate to each end sufficiently to permit upward projection thereinto of said vertical support columns, and has at each end a pair of spaced apart ears turned downward into the hollow interior thereof out of the top wall to close fittingly receive therebetween the sidewalls of said vertical support column to thereby lock each said column against rotation relative to said beam, each said vertical support column being of hollow generally rectangular cross-section formed from a pair of vertical U-shaped channel sections having their facing sidewalls arcuately cut-out proximate to the lower ends thereof to provide an axle sleeve receiving recess within which said axle sleeve is rigidly fixed by means which lock the column channel sections together.

5. The wheeled vehicle as set forth in claim 3 wherein said front wheels caster swivel bearings each comprise a bearing housing and a wheel holding fork having a cylindrical shaft fixed thereto and extending vertically axially rotatably through an upper sleeve bearing and a lower combination radial and thrust bearing disposed within the bearing housing, said upper sleeve bearing being suspended within said bearing housing by resilient elastomer means disposed between said sleeve bearing and the inside wall surface of said bearing housing radially outward of said wheel holding fork cylindrical shaft, whereby said sleeve bearing is resiliently radially shiftable within said bearing housing in response to forces exerted radially through said fork shaft due to horizontal force components exerted on the fork carried wheel to thereby act as a shock absorber.

6. A flexible bed wheeled vehicle comprising in combination:

(1) a one piece bed made from substantially uniform thickness sheet material comprising a plurality of adjacent parallel rectilinear ribs extending longitudinally from front to back of the bed and convoluted as viewed in cross-section to form alternating crests and troughs, the vertical distance between the top of a crest and the bottom of a trough being many times greater than the sheet material thickness to thereby form a bed which is substantially inflexible about axes orthogonal to said ribs and flexible within limits about axes parallel to said ribs, (2) a support structure including front and rear spaced apart substantially parallel rigid support beams extending substantially orthogonally to said bed ribs in underlying relation to said bed with substantially all of said troughs seated upon and supported by said beams, so that lines joining the ends of one beam with the opposite ends of the other beam extend diagonally to the longitudinal extent of said bed ribs, whereby said bed may flex about such diagonals within limits, (3) means securing said bed to said support structure, and (4) a plurality of wheels with at least one wheel carried by said support structure in underlying relation to said bed proximate to each end of said front and rear rigid support beams, the rear wheels being each carried on an axle extending close fittingly through a sleeve secured to the lower end of a vertical support column, the upper end of which column is projected into and rigidly locked to said rear rigid support, and a reinforcing strut for each rear wheel having a lower end through which said axle sleeve is close fittingly projected and an upper end fixedly secured to a trough of said bed at a point thereon longitudinally displaced from the axle position to thereby incline the strut at an angle to the plane of the bed, and the front wheels being each of the caster type mounted in a swivel bearing for rolling motion about a horizontal axis and swivelling movement about a vertical axis, (5) an elongated handle pivotally secured to said front support beam and extending forward therefrom to a handle grip, said handle having a tow bar pivotally secured to the underside thereof proximate to the handle grip for connecting said vehicle to a pulling device, said tow bar being swingable longitudinally of said elongated handle selectively to an out of the way position between said handle grip and the vehicle or to an operative position extending longitudinally outward beyond said handle grip, and latching means partly associated with said tow bar and partly associated with said elongated handle for latching said tow bar in the out of the way position when not in use.

References Cited by the Examiner

UNITED STATES PATENTS

| 2,256,037 | 9/1941 | Reid | 296—28.2 |
| 2,508,674 | 5/1950 | Jolly | 296—28.2 |
| 3,185,519 | 5/1965 | Turnbull et al. | 296—28.2 |

FOREIGN PATENTS

| 435,191 | 5/1948 | Italy. |

LEO FRIAGLIA, *Primary Examiner.*